(12) United States Patent
Salvesen

(10) Patent No.: US 8,138,647 B2
(45) Date of Patent: Mar. 20, 2012

(54) PULSE ADAPTER ASSEMBLY

(76) Inventor: Richard S. Salvesen, Hampton, IA (US)

(*) Notice: Subject to any disclaimer, the term of this patent is extended or adjusted under 35 U.S.C. 154(b) by 223 days.

(21) Appl. No.: 12/701,233

(22) Filed: Feb. 5, 2010

(65) Prior Publication Data

US 2011/0193438 A1 Aug. 11, 2011

(51) Int. Cl.
*H02K 21/00* (2006.01)
(52) U.S. Cl. .................................................. 310/152
(58) Field of Classification Search .................. 310/152, 310/68 B, 348, 80; 130/348
See application file for complete search history.

(56) References Cited

U.S. PATENT DOCUMENTS

| | | | |
|---|---|---|---|
| 2,768,316 A * | 10/1956 | Neiss | ............... 310/95 |
| 3,305,825 A | 2/1967 | Godbey | |
| 3,470,892 A | 10/1969 | Barker | |
| 4,535,429 A | 8/1985 | Russell et al. | |
| 4,636,995 A | 1/1987 | Russell et al. | |
| 4,727,754 A | 3/1988 | Ruckel | |
| 4,802,150 A | 1/1989 | Russell et al. | |
| 5,224,394 A | 7/1993 | Kalinoski | |
| 5,520,058 A | 5/1996 | Campbell et al. | |
| 6,898,150 B2 | 5/2005 | Hahn et al. | |
| 6,986,282 B2 | 1/2006 | Ciglenec et al. | |
| 7,795,783 B2 * | 9/2010 | Trochesset et al. | ........... 310/334 |
| 2007/0035212 A1 * | 2/2007 | Straub et al. | ................. 310/348 |

FOREIGN PATENT DOCUMENTS

WO WO2008092937 8/2008
* cited by examiner

*Primary Examiner* — Nguyen N Hanh
(74) *Attorney, Agent, or Firm* — Zarley Law Firm, P.L.C.

(57) ABSTRACT

A pulse adapter assembly that includes a pulse assembly that has a housing with a cavity disposed therein that receives a sensing device and a driven magnet. The adapter assembly has a shaft having a bearing assembly thereon and driver magnet wherein the shaft is disposed within the cavity of the pulse assembly such that the driven magnet and driver magnet couple to position the driven magnet at a predetermined distance from the sensing device. A workpiece such as a flow meter is attached to the adapter assembly wherein the sensing device monitors the driven magnet to determine an operational parameter of the workpiece.

12 Claims, 2 Drawing Sheets

PULSE ADAPTER ASSEMBLY

BACKGROUND OF THE INVENTION

This invention is related to a pulse adapter assembly. More specifically, this invention is related to a pulse adapter assembly that is utilized in association with an oil flow meters.

In the petroleum process control industry positive displacement flow meters are used to accurately measure the volume of hundreds of various liquid chemicals and other products. These products are often toxic, flammable, corrosive or otherwise dangerous.

All positive displacement meters operated by rotating vanes, paddles, or oscillating disks or pistons which eventually rotate a shaft that exit the meters case through a seal or packing gland. Before electronics were used for the registering or monitoring of the meters output, a "stack" consisting of a counter and possibly a preset device and printer would be installed on the meter in such a way that the meter output shaft would mechanically drive the devices in the stack.

The first application of remotely monitoring the meter was the use of a pulse assembly attached to meter counter or directly to the meter output shaft. These devices would use a cam to operate a mechanical switch or a magnet to operate a reed switch or solid state sensor. In any case, the pulser was still driven by the meter output shaft.

Given that the seal or packing and shaft would eventually wear and leak, some meter manufacturers have designed "glandless" pulsers which use a driver magnet internal to the meter which couples to a driven magnet in the pulser, thus eliminating the output shaft and seal. Typically, the driven magnet is mechanically coupled to an optical rotary encoder or similar pulse producing device.

The design of currently available pulsers are specific to brand of meter and are not readily adaptable to other brands. In addition, many meter manufacturers do not offer such a "glandless" device.

Current available pulsers can be mounted in only one or a limited number of positions. Because all are fitted with a conduit hub for wiring this can cause complication in conduit routing, especially in classified hazardous areas where rigid conduit is required.

Recently, semi-conductor manufacturers have introduced integrated circuits, "chips" that are capable of detecting the rotational position of a diametrically polarized magnet. One chip in particular, is capable of producing multiple outputs including two channels of pulses 90 degrees out of phase (quadrature); absolute position in degrees of rotation; absolute position in hexadecimal (0-1024 bits); and pulse width modulation proportional to position.

Even with all the advances in the arts, many problems still remain. These problems include being unable to adapt a single pulse adapter assembly for any type of flow meter. In addition, typical pulse adapter assemblies are very complex with many parts, are expensive to manufacture, difficult to maintain and typically are not sealed allowing contaminates to enter into the assemblies. As a result of all these problems typical pulse adapter assemblies wear out quickly are expensive and can be very inefficient and inaccurate.

Therefore, a principal object of the present invention is to provide a universal pulse adapter assembly.

Yet another object of the present invention is to simplify and reduce the amount of parts of a pulse adapter assembly.

These and other features, advantages and objectives will become apparent from the specification and claims.

BRIEF SUMMARY OF THE INVENTION

A pulse adapter assembly that has a pulse assembly, an adapter assembly and a workpiece. The pulse assembly has a housing with a cavity disposed therein that receives a sensing device and a driven magnet. The adapter assembly has a shaft with a bearing assembly thereon and a driver magnet wherein the shaft is disposed within the cavity of the pulse assembly such that the driver magnet and driven magnet couple to position the driven magnet at a predetermined distance from the sensing device. A workpiece such as a flow meter is attached to the adapter assembly so that the sensing device monitors the driven magnet to determine an operational parameter of the workpiece.

DETAILED DESCRIPTION OF THE PREFERRED EMBODIMENT

Figure 1:
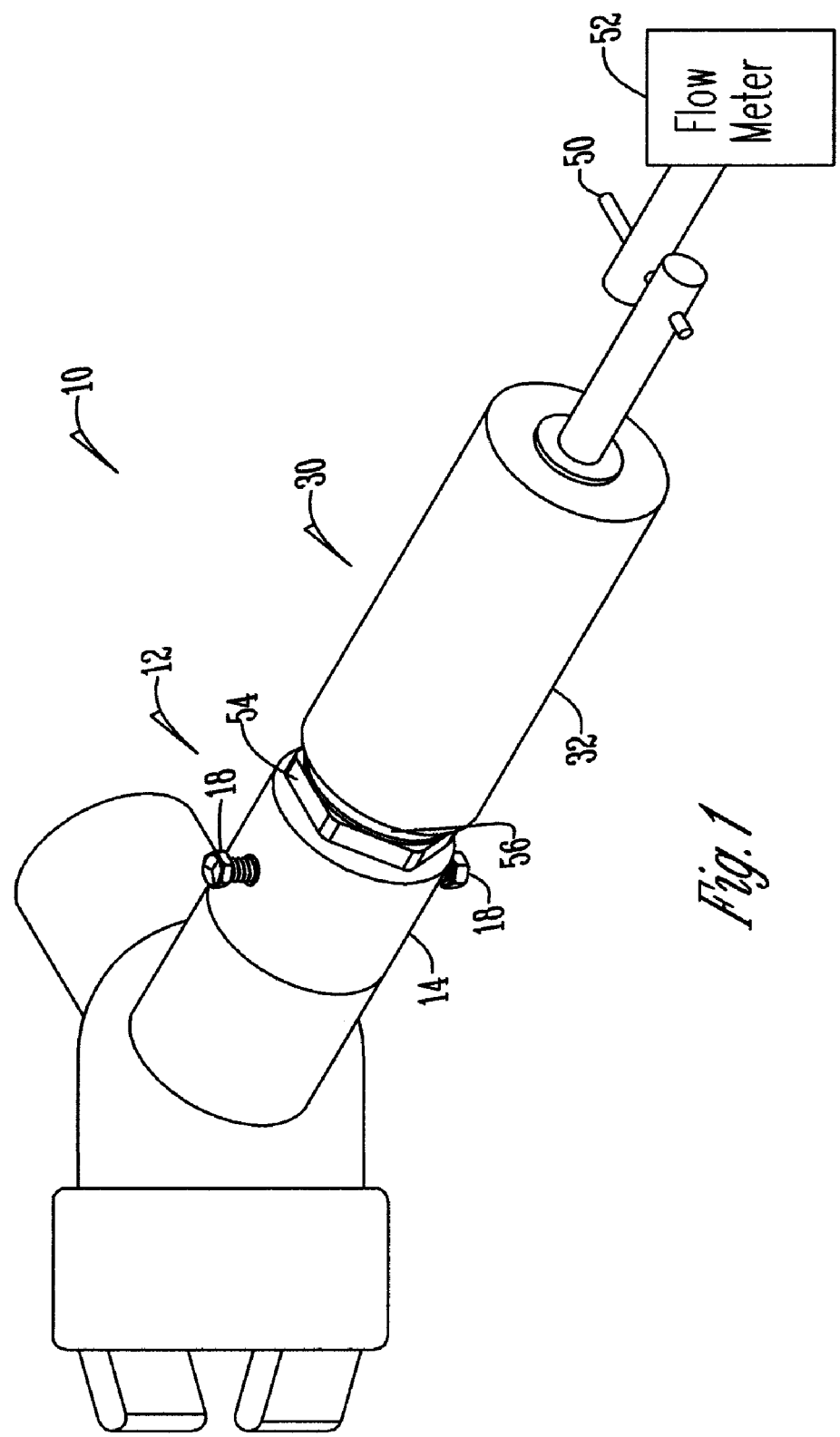
FIG. 1 is a perspective view of a pulse adapter assembly.

The figures show a pulse adapter assembly 10. The pulse adapter assembly 10 has a pulse assembly 12 that includes a rotatable housing 14 that can be rotated 360 degrees. The rotatable housing 14 has a cavity 16 and at least one seal screw 18 disposed therethrough. Disposed within the cavity 16 is a sensor device 20 that includes a rounded circuit board 22 that contains a sensor chip 24 wherein the sensor device 20 is potted in place with epoxy within the cavity 16 of the housing 14.

An anti frictional disk 26 that in a preferred embodiment is a Teflon disk, is also placed within the cavity 16 of housing 14 along with a driven magnet 28 that engages the anti frictional disk 26 such that the driven magnet 28 is free to spin on the slippery anti frictional disk 26 and there are no mechanics of any kind to wear or get out of alignment. The area around the driven magnet 28 is sealed from the environment so contamination also cannot cause issues. In addition, before the pulse assembly 12 is installed on an adapter assembly 30, the driven magnet 28 is free to float within the cavity 16.

The adapter assembly 30 includes a housing 32 that has a tapered end 34 such that the tapered end 34 can be placed within the cavity 16 of the housing 14 of the pulse assembly 12 and the seal screws 18 may be tightened to effectively seal the housing 14 of the pulse assembly to the housing 32 of the adapter assembly 30 so that no contaminates can enter the interior of the either assembly 12 or 30.

The housing 32 has a hollow interior that receives a shaft 36. The shaft 36 has a driver magnet 38 coupled to a compression ring 40 at a first end and includes a bearing assembly 42. The radial clearance between the shaft 36 and bearing assembly 42 is sufficiently large that with extreme temperatures and pressure the sidewall friction is negligible with respect bearing end friction.

The bearing assembly 42 has end faces 44 that are axially loaded with polished shim washers 46 and a spring 48. This arrangement has a dual purpose in that the bearing assembly 42 ultimately determines the radial position of the driven magnet 28 in the pulse assembly 12. By end loading the parallel faces 44 of the bearing assembly 42, the shaft 36 is always perpendicular to the housing 32, therefore centering the shaft 36 and magnets 28 and 38. Because the bearing assembly 42 is spring loaded, any wear is automatically compensated for and any side torque is redirected as an axial force further reducing radial wear on the bearing assembly 42.

At a second end of the shaft 36 is a coupling 50 that is used to couple the shaft 36 to a workpiece 52. In a preferred embodiment the workpiece 52 is a flow meter; however, could be any type of workpiece that has an operational parameter that may be determined using the assembly 10 without falling outside the scope of this disclosure.

Figure 2:
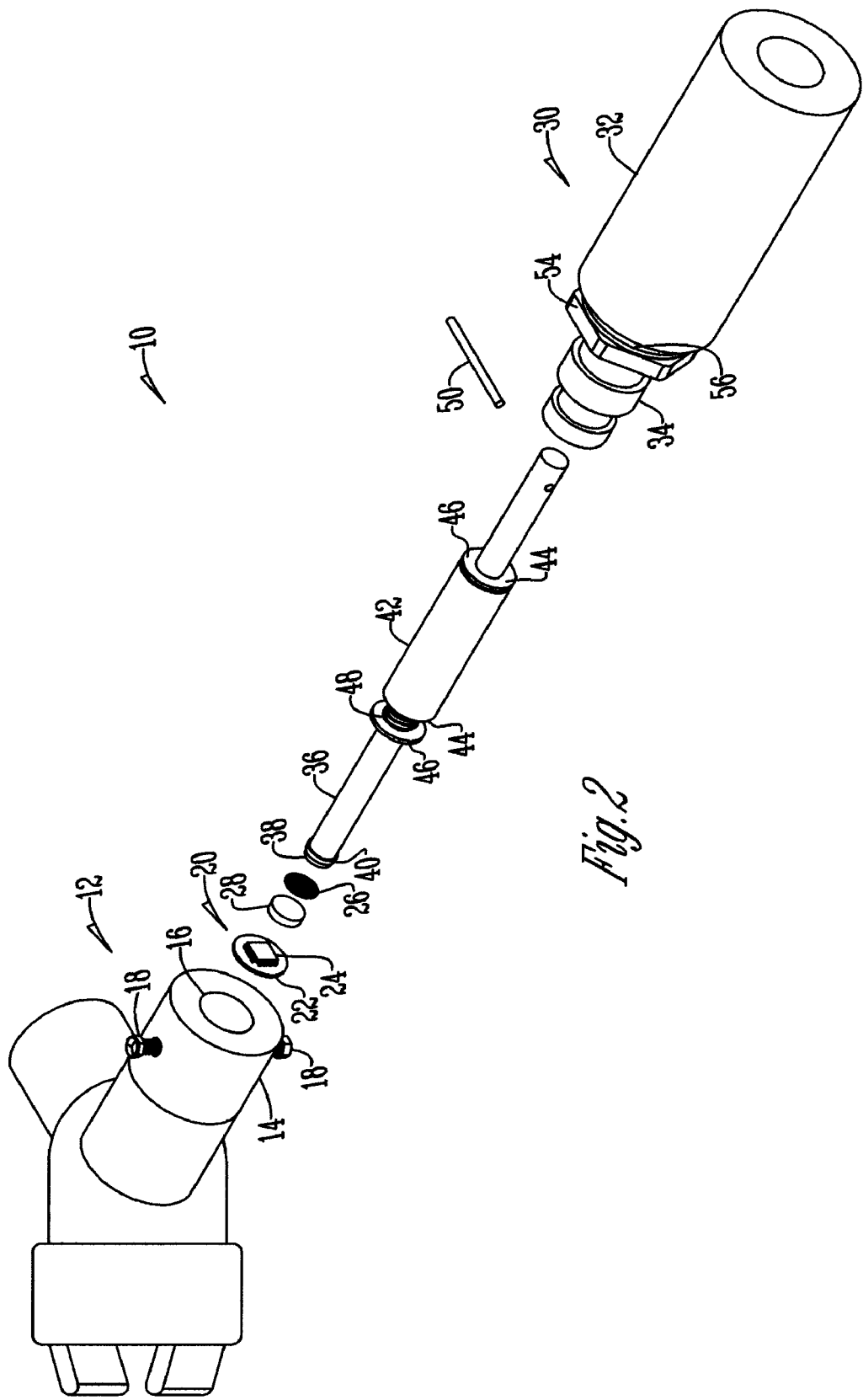
FIG. 2 is an exploded perspective view of a pulse adapter assembly.

For a better understanding, in the exploded view of FIG. 2 the tapered end 34 is disposed within cavity 16 along with the sensor device 20, anti-frictional disc 26 and driven magnet 28. The shaft 36, driver magnet 38, compression ring 40 and bearing assembly 42 are disposed within the housing 32. The housing 32 also includes a jamnut 54 and o-ring 56 to secure a sealed connection between the housing 32 of the adapter assembly 30 and the housing 14 of the pulse assembly 12 to seal the interior of the assembly 10 when in the wetted confines of a work piece 52 such as a flow meter.

In operation, the pulse adapter assembly 10 mounts in or onto a workpiece 52 such as a meter housing in place of a packing or seal assembly. The pulser assembly 12 rotates 360 degrees to position the conduit hub for easy wiring. The seal screws 18 are provided to clamp the pulse assembly 12 and adapter assembly 30 together. The screws 18 engage the adapter assembly 30 on a tapered end 34 so that the two assemblies 12 and 30 are pulled together as the screws 18 are tightened to seal the interior of the assembly 10. This ensures the proper distance between the driver and driven magnets 28 and 38 is maintained after installation. Once connected, the magnets 28 and 38 lock onto each other or are coupled so that the driven magnet 28 is perfectly aligned and properly spaced from the sensor chip 24. In addition, the sensor device 20, the driven magnet 28 and the driver magnet 38 are completely sealed within the housings 14 and 32. At this time, an operational parameter of the workpiece 52 can be determined by the pulse adapter assembly 10.

Thus provided is a pulse adapter assembly that eliminates parts and provides for efficient manufacturing. In the embodiment where the pulse adapter assembly 10 is used on a workpiece 52 that is a flow meter, the pulse assembly 12 always remains the same regardless of the make of meter the assembly 10 is attached to. Specifically, the only difference between these meters is drive shaft length and the type of coupling used. Thus, the internals of the adapter assembly 30 remain the same so that only a few parts need to vary to accommodate all currently available meters and those yet to be designed.

The materials for the components may vary depending on the fluid being metered. The housings 14 and 32 are typically made of aluminum but can be any non magnetic material including plastic. In a preferred embodiment Teflon is used for the bearing assembly 42 because Teflon has a very low coefficient of friction and is compatible with the widest variety of chemicals. Meanwhile, the shaft 36 is preferably made of stainless steel.

In the embodiment where the workpiece 52 is a flow meter, flow meters are often subjected to high vibration due to pump pulsations and other factors. Thus, the shaft 36 needs to turn freely and consistently so as not to effect the accuracy of the meter. At the same time, if the shaft 36 turns too freely, vibration can cause false output pulses affecting the accuracy of the meter. The present adapter assembly 10 causes a specific small amount of torque to be applied to the shaft 36 before the drive shaft turns. In addition, the coupling 50 of the present design is presented as a loose design to align for misalignment. Thus, the small amount of torque ensures that the coupling is always in contact with the meters drive mechanism.

Thus, provided is a pulse adapter assembly 10 that uses the same construction for any make of meter. The adapter assembly 30 varies only in housing design, shaft length and coupling. These items do not affect the design or performance of the device. In addition, because assembly 10 is a two-part device, 360 degrees of rotation of the pulser assembly 12 can be provided for easier wiring to a conduit hub.

In addition, the pulse adapter 10 presents a coupling magnet 28 that is also the sensing magnet for the sensing device 20 and is held in a proper radial alignment by the driver magnet 38 in the adapter assembly 30 and proper axial distance by virtue of the clamping mechanism of the two components when the device is installed. The driven magnet 28 rides on an anti frictional disk 26 so that any radial displacement while rotating does not cause friction or wear on what would be mechanical linkages in other pulse adapter assemblies. Thus, all these mechanical linkages are eliminated.

Also, the chamber in which the driven magnet 28 of the pulse assembly 12 is installed is totally sealed from the environment thus eliminating any contamination which could impair the operation of the magnet 28 or sensing device 20. The shaft 36 and bearing assembly 42 similarly provide advantages because the bearing assembly 42 is axially spring loaded. As a result of the bearing assembly 42 being axially spring loaded a constant torque is provided to maintain coupler contact with a meter drive, compensation for wear on the bearing assembly 42 is provided, radial loads are converted from the coupler 50 to axial loads on the bearing assembly 42 and concentricy of the driver magnet 38 to the driven magnet 28 is maintained. Thus, at the very least all of the stated objectives have been met.

It will be appreciated by those skilled in the art that other various modifications could be made to the device without departing from the spirit and scope of this invention. All such modifications and changes fall within the scope of the claims and are intended to be covered thereby.

What is claimed is:

1. A pulse adapter assembly comprising:
  a pulse assembly having housing with a cavity disposed therein that receives a sensing device and a driven magnet;
  an adapter assembly having a shaft having a bearing assembly thereon and a driver magnet wherein the shaft is disposed within the cavity of the pulse assembly such that the driven magnet and driver magnet are coupled to position the driven magnet at a predetermined distance from the sensing device;
  a work piece attached to the adapter assembly; and
  wherein the sensing device monitors the driven magnet to determine an operational parameter of the work piece.

2. The assembly of claim 1 wherein the work piece is a flow meter.

3. The assembly of claim 1 wherein the housing of the pulse assembly rotates 360 degrees.

4. The assembly of claim 1 further comprising a Teflon disk disposed within the cavity of the housing of the pulse assembly to engage the driver magnet such that the driver magnet rotates against the Teflon disk.

5. The assembly of claim 1 wherein the adapter assembly has a housing disposed around the shaft and bearing assembly that has a tapered end that is received within the cavity of the housing of the pulse assembly.

6. The assembly of claim 5 further comprising at least one sealing screw disposed through the housing of the pulse assembly and engaging the housing of the adapter assembly to seal the sensor device, driven magnet and driver magnet within the pulse adapter assembly.

7. The assembly of claim 1 wherein the bearing assembly has end faces that are axially spring loaded.

8. The assembly of claim 7 wherein the axially spring loaded bearing assembly provides a constant torque on the shaft.

9. The assembly of claim 7 wherein the axially spring loaded bearing assembly compensates for wear on the bearing.

10. The assembly of claim 7 wherein the axially spring loaded bearing assembly converts radial loads from a coupler on the shaft to an axial loaded on the bearing.

11. The assembly of claim 7 wherein the axially spring loaded bearing assembly maintains concentricy of the driver magnet to the driven magnet.

12. The assembly of claim 1 wherein the sensing device comprises a sensor chip on a circuit board.

* * * * *